Oct. 10, 1939.    M. H. GRAHAM    2,175,727
APPARATUS FOR MAKING COFFEE INFUSIONS
Filed April 29, 1937    7 Sheets-Sheet 2

Inventor
MAURICE H. GRAHAM
By Paul, Paul Ullom
ATTORNEYS

Oct. 10, 1939.                M. H. GRAHAM                 2,175,727
                 APPARATUS FOR MAKING COFFEE INFUSIONS
                    Filed April 29, 1937        7 Sheets-Sheet 4

Inventor
MAURICE H. GRAHAM
By Paul, Paul &Moore
                      ATTORNEYS Oct. 10, 1939.    M. H. GRAHAM    2,175,727
APPARATUS FOR MAKING COFFEE INFUSIONS
Filed April 29, 1937    7 Sheets-Sheet 5

Inventor
MAURICE H. GRAHAM
By Paul, Paul & Moore
ATTORNEYS

Oct. 10, 1939.　　　M. H. GRAHAM　　　2,175,727
APPARATUS FOR MAKING COFFEE INFUSIONS
Filed April 29, 1937　　　7 Sheets-Sheet 7

Inventor
MAURICE H. GRAHAM
By Paul, Paul Moore
ATTORNEYS

Patented Oct. 10, 1939

2,175,727

UNITED STATES PATENT OFFICE 2,175,727

APPARATUS FOR MAKING COFFEE INFUSIONS

Maurice H. Graham, St. Louis Park, Minn.

Application April 29, 1937, Serial No. 139,761

20 Claims. (Cl. 53—3)

A general object of the invention is to provide a simple, efficient apparatus for making infusions of coffee.

Another broad object of the invention is the provision of such apparatus in which the infusion is effected substantially without boiling any of the infused liquid.

Again it is an object of the invention to provide a simplified apparatus for making coffee infusions substantially without boiling any of the infused liquid wherein infused liquid is continuously recirculated through the coffee.

Also, the invention contemplates the provision of an efficient and simple apparatus for making infusions of coffee substantially without boiling the infused liquid which is automatic in operation, is easy to set in operation, and will operate to make uniform infusions.

Moreover, it is an object of the invention to provide such automatic apparatus which may readily be adjusted to make various predetermined quantities of infusion.

Furthermore, the infusion has for one of its objects the provision of an automatic apparatus for making coffee infusions substantially without boiling infused liquid which is provided with a simplified control for regulating the maximum temperature at which the infusing liquid contacts the coffee, whereby the taste of the infusion may be readily controlled.

Additional objects are the provision of such apparatus which will be safe in operation, will give maximum extraction of the coffee under desirable temperature conditions, will not readily get out of order, and will make the extraction in a minimum of time.

These and numerous other objects of the invention will become more readily apparent upon a detailed reading of the accompanying specification and drawings, together with the appended claims.

Referring now more particularly to the drawings—

Figure 1:
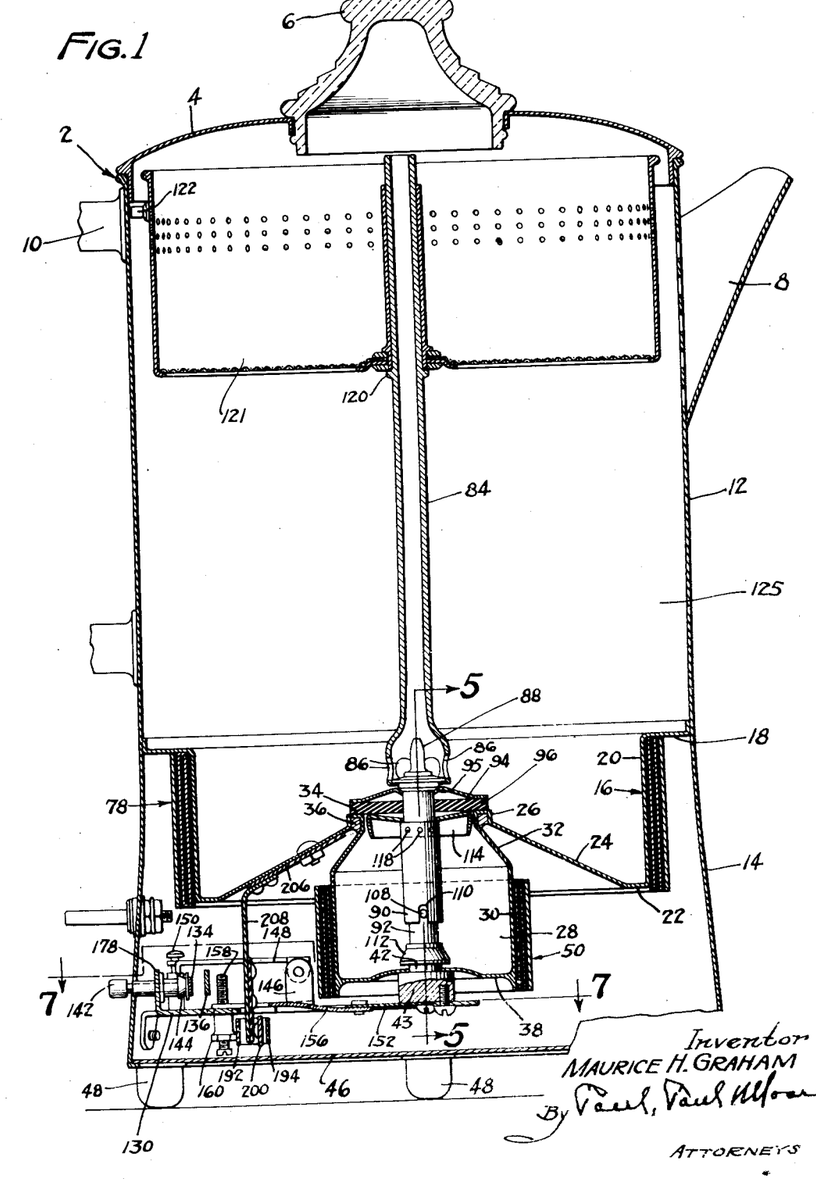
Figure 1 constitutes a vertical sectional view through a coffee making apparatus made in accordance with the present invention, the said section being taken along the line 1—1 of Figure 2.

In the drawings, Figure 1 shows a coffee making apparatus comprising in this case a substantially cylindrical member 2 of sheet metal or the like having a suitable top 4 provided with any desired form of spreading means 6, and also having the usual form of pouring spout 8 and any desired type of handle 10.

The member 2 consists of an upper cylindrical wall portion 12 and a lower somewhat flared cylindrical wall portion 14 constituting a continuation of the upper portion 12 and being somewhat in the nature of a skirt. Mounted within the member 2 is a transverse member generally designated at 16 and consisting of an annular ring portion 18 joined to the inner wall of member 2 at the junction between the upper wall portion 12 and the lower skirt portion 14 by any suitable means such as by welding or soldering a turned edge thereto. The transverse member further consists of a cylindrically shaped portion 20 which depends from and is preferably integral with the annular ring portion 18. Again, the partition member 16 includes an annular ring portion 22 which is at right angles to the cylindrical portion 20 at the bottom thereof, and an upwardly sloping annular wall portion 24 having an upper vertical edge 26 defining a central circular opening. The portions 18, 20, 22, 24 and 26 of the transverse member 16 may be made of separate pieces but preferably these portions are integral as above stated.

Numerals 30 and 38 designate the side walls and bottom, respectively, of a well 28 of generally circular cross-section. The upper portion of the sides of the well is tapered inwardly as at 32 and the upper edge of the well is flanged as at 34 to provide a flat, annular upper surface constituting a seat for a cap or partition member to be later described. The upper flanged edge 34 is secured to the edge 26 of the transverse member by any suitable means making a fluid-tight connection such as by welding, soldering or the like 36. Thus the well 28 is connected to and suspended from the edges of the central opening in the transverse member 16. Such connection in effect makes the walls of well 28 a continuation of the partition member 16. The bottom 38 has a raised central portion 40 causing liquid within the chamber to drain towards the outer walls thereof when the level of the liquid is low. At the center of the bottom 38 there is mounted a stud 42 extending vertically upwardly inside of the chamber. Such stud has an enlarged base portion 43 which is positioned on the outside of the bottom wall 38 and such wall is secured to the stud 42 and its enlarged base 43 in any desired manner, as for instance by welding or soldering to make a fluid-tight connection. The stud 42 has an upper screw-threaded portion 44 of reduced diameter.

Below the transverse member 16 and the well 28 there is an open space in which controls are conveniently mounted. Such open space is preferably closed off by a bottom 46 engaging the lower edges of the skirt 14 and the device is further provided with any suitable form of legs 48.

Figure 12:
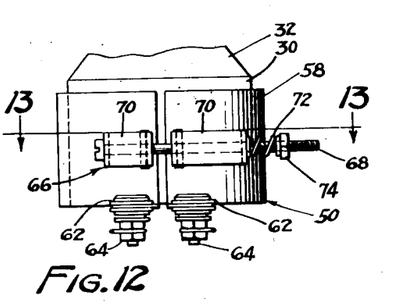
Figure 12 is a partial view in front elevation showing details of construction of one of the heating elements and means for tensioning the same.
Figure 13:
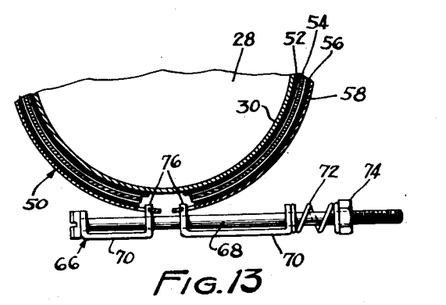
Figure 13 is a cross-sectional view along line 13—13 of Figure 12.

Numeral 50 designates generally a flexible heating element which encircles the outside of the vertical side wall 30 of the well 28 and it is held in tensioned engagement therewith. The construction of such flexible heating element and its tensioning means are shown in some detail in Figures 5, 12 and 13. Referring more particularly to these figures, numeral 52 designates an inner sheet or layer of insulating material which is directly in engagement with the vertical wall 30 of the compartment 28. This sheet of insulation is preferably mica or some other suitable transparent flexible insulating material. Numerals 54 and 56 designate intermediate and outer layers of mica or other insulating material and numeral 58 designates an outer layer of sheet steel or other flexible, preferably non-transparent, strong material by means of which the mica sheets may be pressed against the wall 30. Numeral 60 designates a resistance wire which is wrapped around the intermediate heating element 54 and thus only engages the mica insulating sheets. This resistance wire may consist of microme wire or any other suitable resistance material and it is preferably wrapped around the intermediate mica sheet 54 substantially throughout its entire length. Numeral 62 designates bent-over lugs formed integrally with the outer steel sheet 58 and these lugs serve as a support for suitably insulated terminals 64 to which the ends of the microme resistance wire 60 are connected and to which circuit connections are made. In securing the flexible heating element 50 to the wall 30 of the compartment 28 the layers of insulating material and sheet steel are arranged in the relationship just described and are then wrapped around the outside of the wall 30. For the purpose of holding the same in place, there is provided any suitable tensioning means for the outer sheet steel covering 58 as, for example, a tension clamp 66 consisting of a rod 68 upon which there are slidably mounted bracket members 70 which are resiliently urged toward one another by a spring 72 held in place by a suitable nut 74. The bracket members 70 have inturned portions 76 extending into openings at opposite ends of the sheet metal strip 58 and when the bracket members 70 are urged together under the tension of the spring 72 the sheet metal member 58 will be resiliently compressed and will hold the sheet mica members and the microme wire in place against the outside of well 28 as will be readily apparent from Figures 12 and 13.

Figures 11, 14, 15:
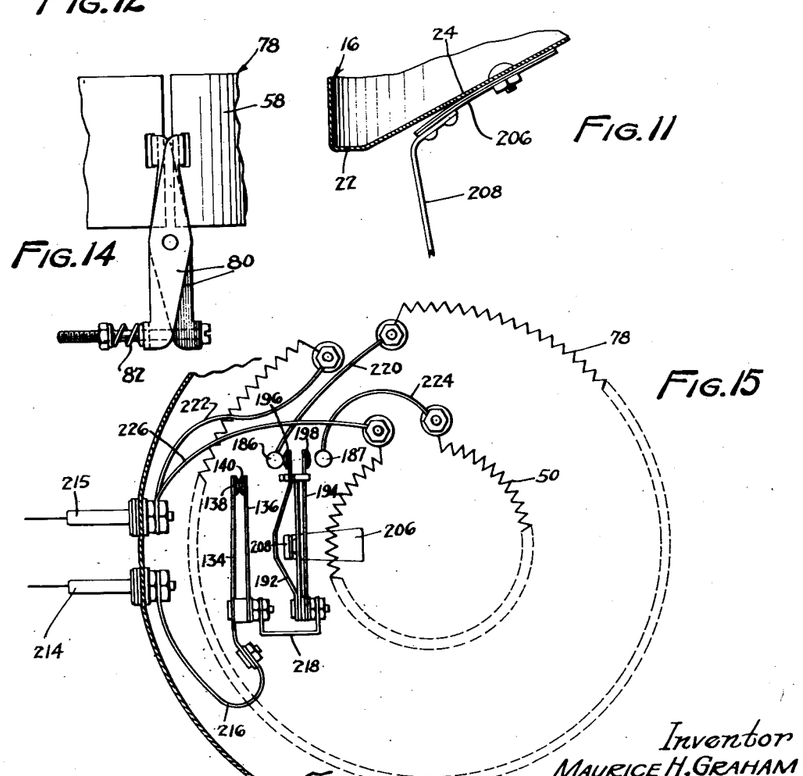
Figure 11 is an enlarged partial view showing a bimetallic element for effecting an intermediate control of the heating elements of the apparatus.
Figure 14 is an enlarged partial view in front elevation showing tensioning means for another heating element.
Figure 15 is a schematic wiring diagram.

Numeral 78 generally designates a second flexible heating element which may be of the same construction as the heating element 50. In the modification of the invention herein disclosed, such heating element is of identical construction except as to size and with the further exception that a slightly different means is employed for tensioning the element against the outer surface of the vertical, cylindrical wall portion 20 of the transverse member 16. Figure 14 illustrates the different form of tensioning means employed and as there shown, these means consist of pivoted members 80 which are resiliently urged together by an adjustable spring 82 at one end and engage openings in the outer sheet metal member 58 of the heating element at their opposite ends for the purpose of drawing the ends of the sheet metal member 58 together.

Figures 5, 6, 7, 8, 9, 10:
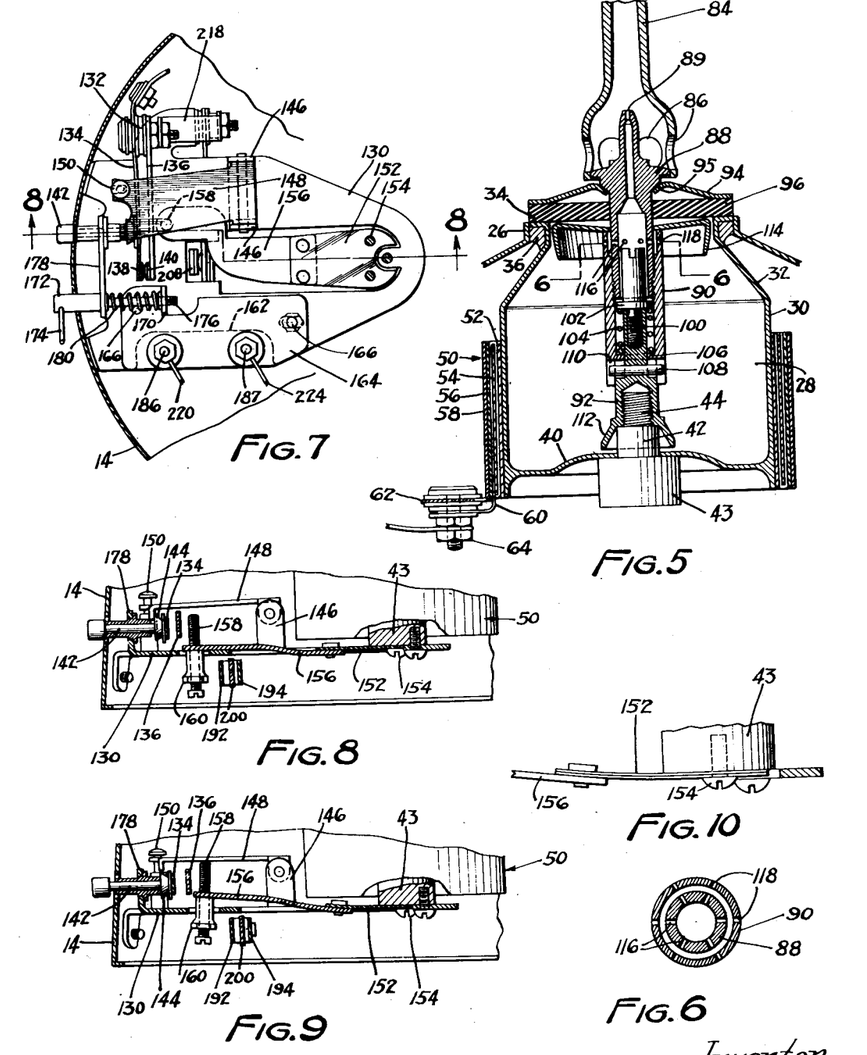
Figure 5 is an enlarged sectional view along the line 5—5 of Figure 1 and shows in detail the construction of a steam injector nozzle assembly.
Figure 6 is a sectional view along the line 6—6 of Figure 5.
Figure 7 is a sectional view along the line 7—7 of Figure 1 looking in the direction of the arrows.
Figure 8 is a sectional view along the line 8—8 of Figure 7.
Figure 9 is a view similar to Figure 8 but showing the parts in different position.
Figure 10 is an enlarged partial view showing the arrangement of a bimetallic element for automatically deenergizing the apparatus when the coffee making operation is concluded.

A liquid circulating unit for the device is shown in Figures 1 and 5. This unit consists of a circulating tube 84 having an enlarged lower portion provided with liquid inlet openings 86. The tube 84 is mounted upon and preferably permanently secured to a steam injector assembly whose principal parts are a nozzle member 88, an outer sleeve 90 detachably secured to the nozzle member at its lower end as for instance by screw threads, a base member 92 projecting downwardly from the bottom of the outer sleeve, and a cap or partition member 94, 96. As shown in the drawings, the partition member consists of a circular disk 94 of sheet metal and a lower circular disk of rubber or other resilient material, each of which is provided with a central circular opening for the nozzle member 88. The central opening of the rubber disk 96 is preferably of such size as to make a snug fit with the nozzle member 88 when the circulating unit is in the position shown in Figures 1 and 5, and as will be readily obvious this disk forms an insulating wall between the well 28 and the compartment 125. The edge of the central opening of the sheet metal disk 94 is bent inwardly as at 75

95 and its upper surface and engages an inclined shoulder formed on the nozzle member 88 whereby a tight connection is made between the cap or partition member 94 and the outside of the nozzle member 88 when these members are held in compressed relation. The base member 92 is provided at its upper end with a portion of reduced diameter which is recessed and provided with interior screw threads. A screw member 100, provided with an enlarged head 102 having edges extending beyond the end of the upper reduced portion of the base member 92 is screwed into the aforementioned recess. A compression spring 104 is imprisoned in the annular space between the reduced upper portion of the base member 92 and the inside of the outer sleeve 90 by means of the said screw head 102 and a shoulder 106 extending inwardly in the sleeve member 90. The base member is provided with a transversely mounted pin 108 passing through suitable slots 110 formed in the lower portion of the outer sleeve member 90. This slot and pin arrangement permits of relative sliding movement between the sleeve 90 and the base member 92 but prevents relative rotation between these members. The lower portion of the base member 92 is provided with a screw threaded recess and a downwardly extending skirt 112 having a sloping inner surface. This screw threaded recess receives the upper screw threaded portion 44 of the permanently mounted stud 42 as shown in Figure 5.

A guide member 114 is mounted on the shank of the nozzle member 88 and is provided with sloping down-turned edges which facilitate in guiding the steam injector assembly when it is inserted into the well 28. The guide member 114 simply rests by gravity upon the upper edge of the outer sleeve 90.

The nozzle member 88 is provided with a central bore which is of reduced diameter at its upper end and is of enlarged diameter at its lower end. A series of restricted passageways 116 connect the interior of the enlarged portion of the central bore of the nozzle with the exterior thereof. As shown in Figure 5, the upper end of the sleeve 90 is counterbored and likewise provided with a series of restricted passageways 118 whereby fluid from the well 28 may pass through the passageways 118 into the annular space between the wall of the nozzle member and the outer sleeve 90, through the passages 116, and to the enlarged portion of the central bore of the nozzle member. When the circulating unit is in the position shown in Figures 1 and 5, the partition member 94—96 makes well 28 a fluid tight compartment except for the passageways in the nozzle member and the central passageway constitutes in effect the steam discharge opening of compartment 28.

The circulating unit above described may of course have all its parts permanently connected together. In any event, the several parts are so joined that they are not separated by the user in the normal use of the apparatus, whereby the unitary character of such unit is normally retained.

Thus in the case of the unit shown in Figures 1 and 5 in which, as previously stated, the circulating tube 84 is preferably permanently jointed to the nozzle member 88, the sleeve 90 is preferably screwed very tightly upon the lower portion of the nozzle 88 thereby semi-permanently holding all of the parts constituting the circulating unit in assembled relation. If desired, the user may at intervals take the assembly apart by removing the sleeve 90 for purposes of cleaning and the like.

When the circulating unit is positioned as shown in Figures 1 and 5, the tube 84 extends vertically upward substantially centrally of the pot. The upper portion of the tube is provided with an outwardly extending rim or shoulder 120 which serves to support a holder 121 for the ground coffee. Such holder may be of any desired type and is preferably provided with a number of exterior lugs or pins 122 to insure that it will be centrally positioned when mounted upon the tube 84. As shown in Figure 1, the tube 84 extends through and above the top of the coffee holder.

It will be observed that the well 28 and all that portion of the cylindrical member 2 above the transverse member 16, together constitute a liquid-tight vessel. When the circulating unit is screwed into place as illustrated in Figures 1 and 5, the partition wall or cover 94—96 forms the vessel into two compartments, one consisting of the space in the well below the partition or cover member 94—96, and the other consisting of the space above the transverse member. In this case the sole fluid connection between the compartments is the restricted nozzle opening 89 which is preferably so small that no liquid would run therethrough into compartment 28 from compartment 125 if poured into the latter after the circulating unit is in position, regardless of the temperature of compartment 28. Thus water can only be introduced into compartment 28 by pouring it into the vessel before the circulating unit is secured into position and after it is so secured the water thereby trapped in compartment 28 is in effect a separate body from that in the upper compartment 125.

When the device is to be used for making coffee, the user removes the top 4 and the coffee ground holder 121 in the same manner as is done in the use of a conventional percolator. Also, the user removes the circulating unit above described or at least loosens the same sufficiently to enable introduction of water into the well 28 beneath the partition or cover member 94—96. If the circulating unit happens to be already tightly screwed into position as shown in Figure 1, it can be readily removed or loosened by simply imparting a rotating movement to the top of the tube 84. To facilitate this the upper portion of the tube 84 may be suitably knurled and by reason of the connection between the several parts of the circulating unit as described above, rotation of the tube 84 will result in an unscrewing of the base member 92 from the screw portion 44 of the stationary stud 42. When the base 92 of the circulating unit has been separated from the screw 44, the entire circulating unit may be lifted out of the container.

After loosening or removing the circulating unit the user pours an amount of water into the vessel equal to the total amount of coffee beverage desired. The water will flow into and fill the well 28, which is of relatively small size as compared to the compartment 125, and will partially fill compartment 125 depending upon the amount of water. After the water has been introduced, the user secures the circulating unit into the position shown in Figures 1 and 5 by simply inserting the lower portion thereof into the compartment 28 and rotating tube 84 thereby to screw the base 92 onto the upper threaded portion of stationary stud 42. The lower portion of the circulating unit is easily guided into position by reason of the skirt 112 in the lower portion of the base and the guide member 114, both of which serve to center the assembly with practically no effort on the part of the user. The tube 84 is rotated by the user until the shoulder in the base member 92 at the upper edges of the skirt 112 engages the shoulder formed by the reduced screw-threaded portion 46 on the stud 42 and thereby preventing further rotation. The parts are so designed that these shoulders will not engage until the unit has been pulled down sufficiently to compress the partition member 94—96 against the seat 34 and cause a tight connection at its outer periphery with said seat, and a tight connection at the inner periphery of the disk 94 with the sloping shoulder formed on the nozzle 88. The partition or cover member 94—96 will be yieldingly held in this position by means of the compression spring 104 and as shown in Figures 1 and 5. There is some relative movement between the outer sleeve and the base member when this condition of proper compression is reached. The pin 108 is held against the ends of its slot when the circulating unit is removed. The compartment 28 is now fluid-tight except for the nozzle leading into compartment 125 and the user thereupon places the desired amount of ground coffee in the coffee holder 121 and closes the lid 4.

When this has been done, the heating element 78 is energized by connecting the same to any suitable source of electrical current and the heating element 78 is maintained energized until the temperature of the water in compartment 125 reaches a predetermined temperature depending upon the maximum temperature at which it is desired to make the infusion. Due to the fact that the water in compartment 28 is substantially a separate body, its temperature is substantially unaffected by this heating step. When the predetermined temperature of the water in compartment 125 is reached, the heating element 78 is deenergized and the heating element 50 is energized, whereby the water in the compartment 28 will begin to heat up. Due to the relatively small amount of water in compartment 28 steam will rapidly be generated and this steam will pass into the central bore of the nozzle member 88 and be injected out of its nozzle opening 89 into the water in compartment 125. Upon issuing from the nozzle opening 89 into the lower enlarged portion of tube 84, the steam will cause a flow of water upwardly through the tube 84 in a rather steady and continuous stream. The volume and force of this liquid stream may of course be varied by varying the relative sizes and relation of the parts. In the case of an apparatus made in the proportions shown in Figures 1 and 5, the generation of steam in compartment 28 results in a substantially continuous flow of water upwardly through the tube 84 with sufficient force to strike the spreading member 6 and be distributed over the ground coffee. The water seeps through the ground coffee and the resulting infusion falls back into the compartment 125 where it becomes intermingled with the rest of the liquid in that compartment. The liquid elevated in the tube 84 is continuously supplied through the openings 86 and shortly after the start of the operation comprises coffee infusion. As the operation progresses, the stream becomes of a progressively darker shade indicating that the extraction of the ground coffee in the holder 121 is progressively continuing and showing that the infusion is being recirculated. When the extraction has progressed to the desired degree, the heating element 50 is deenergized and the coffee is ready to serve.

After the deenergization of the heating element 78 as above stated there is a further rise in the temperature of the water in compartment 125 due to the residual heat in element 78 and the heat imparted to such water by the injection of steam from the compartment 28. By regulating the temperature at which the heating element 78 is deenergized, and by regulating the amount of steam injected into the liquid in compartment 125, it is possible to regulate the maximum temperature at which liquid will be circulated through the ground coffee. The compartment 28 is preferably made of such size as to contain just enough water to produce sufficient steam for an amount of circulation producing the desired amount of extraction. In such case the heating element 50 is not deenergized until the water in compartment 28 is substantially all converted into steam and exhausted, the steam being continuously injected into compartment 125 until the extraction is complete. Accordingly no liquid from compartment 125 can enter the steam generating compartment 28. By varying the size of compartment 28, one may obtain any amount of circulation, as for example several times the volume of the water.

Due to the fact that the temperature of the liquid in compartment 125 is cooler than that of the steam discharging from the nozzle 89, it is possible that there may be condensation of the steam in the tip of the nozzle. However, the matter of whether or not this is the case is immaterial to the invention in its broader aspects, all that is required being that the steam supplied to the nozzle member 88 set up a circulation of infusing liquid through the tube 84 and over the coffee in the coffee holder 121. Accordingly, references in this specification and in the claims to the injection of steam into the compartment 125 will be understood to refer to injection either before or after condensation.

After some water has been elevated in the tube 84, passed through the ground coffee, and returned to the compartment 125, the liquid entering the lower portion of tube 84 through the holes 86 and sweeping around the tip of the nozzle 88 so as to be forced upwardly in the tube 84 will consist of diluted or concentrated coffee infusion. However, in the case of a device constructed in accordance with the disclosure of Figures 1 and 5, it has been found that the temperatures at the nozzle member 89 are little higher than the temperature of the main body of the liquid in compartment 125, especially when the maximum temperatures to be reached in the main body of the liquid in the compartment 125 are approached. Accordingly the passage of coffee infusion in intimate relation with the nozzle 89, and the aforementioned injection of steam, do not have a deleterious effect upon the coffee infusion as is the case, for example, in an ordinary percolator wherein portions of the infusion are repeatedly subjected to high temperature and boiled to furnish the steam necessary for circulating the infusing liquid through the circulating tube.

The present invention thus provides a simple means for continuously circulating infusing liquid through the coffee without the necessity of boiling or unduly heating any of the infusion. In the apparatus of this invention, substantially the only liquid which is heated up to or above the boiling point is the plain water in the compartment 28. The circulation of the infusing liquid is effected without deleterious local or general over-heating with consequent adverse taste effects. All parts of the liquid in compartment 125 are maintained below substantially the boiling point, the circulation being effected by steam generated from plain water in compartment 28.

After the heating element 50 is deenergized, the pressure in compartment 28 will be reduced and a small amount of infusion will be drawn into the compartment 28 and overheated, but this amount is so slight as to be insignificant. Moreover substantially all of the over-heated infusion remains in the chamber 28 and need not be used for beverage purposes. Also, the nozzle member may be provided with a check valve preventing suction of infusion into compartment 28 when heating element 50 is deenergized in which case a suitable manually controlled valve for admitting air into the compartment is also provided.

As a specific example of the operation of the apparatus disclosed in Figures 1 and 5, six cups of water may be placed in the vessel and the requisite amount of coffee in the holder 121. The liquid in compartment 125 is heated until it reaches a temperature of 145° F., whereupon heating element 78 is deenergized and heating element 50 is energized. The residual heat in the heating element 78 will elevate the temperature of the body of water in compartment 125 several degrees more, say to 155°. When steam begins issuing from nozzle 89 and elevating the infusing liquid through the tube 84, the temperature of the liquid in compartment 125 will further rise and when the water in compartment 28 has been converted into steam and exhausted and the coffee has been thoroughly extracted, the temperature in compartment 125 will have reached about 186°. Thus in this example, the maximum temperature of liquid circulated through the ground coffee will be 186° and the infusion will not have been "scorched" by subjection to excess heat, either locally or otherwise. The coffee will be ready to serve at about the maximum temperature at which the infusion was made, as distinguished from coffee making devices in which the infusion is collected in a vessel separate from that in which the water was heated up and is accordingly somewhat cooled. By holding the maximum temperature of the infusing liquid to around 186°, there results a mellow coffee which is very pleasing in taste. However, individual preferences may vary and the maximum temperature of the infusing liquid may be altered by simply varying the temperature at which the heating element 78 is deenergized and the heating element 50 energized. Thus one might maintain the heating element 78 energized until the liquid in compartment 125 reached a temperature of 150° or 155° F. whereby infusing liquid would be passed through the coffee at a higher temperature than in the example previously given and a different taste in the final product would result. The apparatus of the present invention thereby not only facilitates the making of infusions of coffee below the boiling point without over-heating the infusion, but further renders a simple means by which the taste of the final infusion may be readily controlled.

Figure 2:
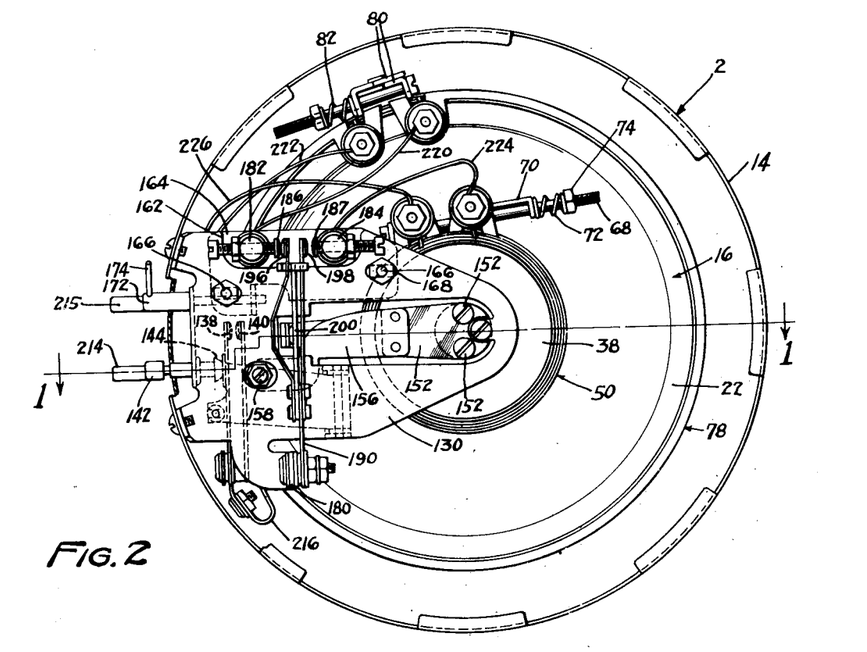
Figure 2 is a bottom plan view of the coffee making apparatus.

While the apparatus of this invention could be operated in the manner set forth above by the operator manually, this would require considerable watching. The apparatus is of such nature as to readily lend itself to a simplified form of automatic control thereby obviating all necessity for watching and rendering the making of coffee infusion entirely automatic from the time the water and coffee are placed in the device. The drawings disclose an illustrative form of control apparatus and this will now be more particularly described, reference being had more particularly to Figures 1 to 4, 7 to 9 and 15. In these figures, the numeral 130 designates a preferably rigid base plate which may be of insulating material but in the apparatus disclosed is formed of sheet metal having downturned lugs by means of which it is supported from the walls of the skirt 14 at one end. The base plate is supported at its other end from the enlarged base 43 of the stud permanently mounted at the bottom of the chamber 30 by a suitable screw. The base plate 130 has an upturned lug 132 upon which there are supported a pair of parallel, spaced, contact arms 134—136 of spring metal having contacts 138—140 at their outer ends. The contact arms are of course suitably insulated from the base plate and they are so mounted that normally their contacts 138 and 140 are separated as indicated in dotted lines in Figure 2. These contacts are in the energizing circuit for both the heater 78 and the heater 50 and before the device can be placed in operation the contacts 138 and 140 constituting the main switch, must be manually closed. Any suitable means for so closing these contacts may be provided but as here shown the closing means consists of a pin 142 which slides in a sleeve mounted upon an upturned lug of the base plate. Pin 142 extends through an opening in the walls of skirt 14 and is provided with an enlarged head outside of the skirt. It is also provided with an enlarged head 144 at its other end inside of the skirt and above the base plate 130. A pair of upturned lugs 146 on the base plate have pivotally mounted thereon a latch member 148 having a downturned latch portion which is adapted to engage the head 144 and prevent removal of the pin toward an outer position when the latch member is in the position shown in Figure 8. Any suitable means may be provided for limiting the movement of a latch such as a stud 150 provided with an enlarged head which cooperates with an extension on the latch to limit its movement. The head 144 is positioned adjacent the spring contact arm 134. When the latch 148 is raised and the pin 142 is in retracted position, the spring contact arm 134 can travel sufficiently far under its own spring tension to cause separation of the main switch contacts 138 and 140. This position of the parts is shown in Figure 2. In order to enable completion of the energizing circuit for the heating elements, the pin 142 must be pushed inwardly from the position shown in Figure 2 by the operator whereby spring contact arm 134 will be pressed in a direction to cause engagements of contacts 138 and 140. When the pin has been so moved, the latch 148 will drop down by gravity and hold the pin in such position until the latch is later released.

Numeral 152 designates a short piece of bimetallic material which is fastened to the under side of the enlarged base 43 of the stud mounted in the bottom of chamber 28 by any suitable means such as a pair of screws 154. The bimetallic member 152 has connected thereto a rigid extension 156 which carries at its outer end an adjustable screw 158 held in place by a lock nut 160. The end of screw 158 is arranged to strike against the latch 148 and raise the same when the temperature to which the bimetallic element 152 is subjected rises a predetermined point whereby the pin 142 will be released when such temperature is reached and the spring contact arm 134 will operate to push out the pin and cause contacts 138 and 140 to disengage. The temperature at which the latch 148 will be moved and the main switch contacts 138—140 separated can be very simply adjusted by adjusting the screw 158. Inasmuch as the enlarged base of stud 43 is mounted in direct contact with the lower wall of chamber 28, the temperature of bimetallic element 152 will closely follow the temperature of the bottom of chamber 28 and the main switch contacts will be separated in response to the condition of chamber 28. Figure 9 shows the bimetallic element and its associated parts in the position when the latch is raised, the main switch contacts are separated, and the pin pushed outwardly.

The base plate is provided with a cut away portion 162 and above this portion there is mounted a slidable plate 164. This slidable plate has mounted thereon a pair of studs 166 which depend through slots 168 formed in the base plate and have their ends screw-threaded and fitted with suitable nuts which are sufficiently loose to enable sliding movement of the plate 164. The sliding plate is provided with an upturned lug 170 having a screw threaded opening. Numeral 172 represents an enlarged head of an adjusting member which projects outside of the skirt 14 and is provided with a handle 174. The adjusting member is provided with a screw threaded end of reduced diameter 176 which passes through an opening in the lug 178 of the main base plate which lug likewise partially supports the aforementioned pin 142 for manipulating the main switch. The threaded end 176 of the adjusting member engages with the screw threaded opening in the upstanding lug 170. A compression spring 180 surrounds the reduced portion 176 of the adjusting screw and is located between the lugs 178 and 170 thereby forcing the slidable plate to the right until the enlarged head 172 engages with the lug 178 and prevents further movement. It will be seen that by rotating the handle 174 of the adjusting screw the position of the sliding plate 164 may be varied.

Figure 3:
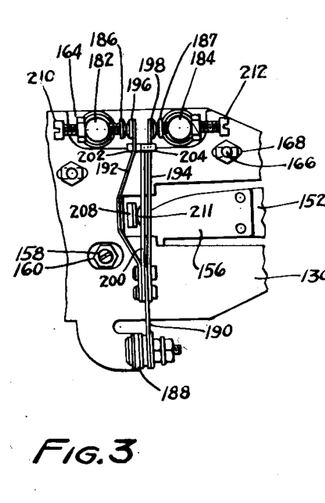
Figures 3 and 4 are views of a portion of the automatic control apparatus.
Figure 4:
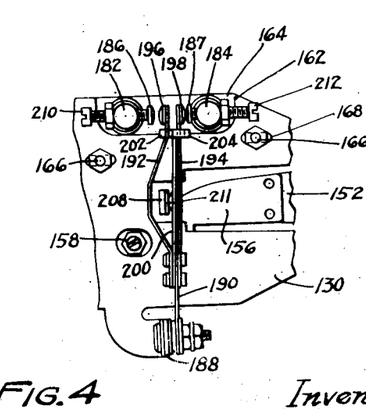

Depending from the slidable plate at the cutaway portion 162 of the base plate are a pair of suitably insulated contact posts 182 and 184 provided with adjustable contact screws 186 and 187 respectively. The main base plate has a downturned lug 188 to which there is fastened a suitably insulated spring metal strip 190. Secured to this are a pair of flexible contact arms 192 and 194 carrying contacts 196 and 198 for engagement with the contacts 186 and 187 respectively. Contacts 186—196 control the energizing circuit for the heating element 78, and contacts 187—198 control the energizing circuit or the heating element 50. In the manual operation of the device as stated above, the heating element 78 was deenergized and the heating element 50 was energized at the same time. However, it is advisable to provide a slight overlap for the reason that the total lapsed time in making the coffee is slightly shorter if the heating element 50 is energized shortly before the heating element 78 is deenergized so that steam will commence to be generated at the time the main body of liquid in the compartment 125 has reached a temperature at which it is desirable to begin injecting the steam and circulating the liquid through the coffee. Any suitable means may be provided for causing the contacts 198 and 187 to make slightly before the contacts 186 and 196 break upon movement of the contact arm assembly. As shown in Figures 3 and 4, there is here provided a rigid strip 200 which is connected to flexible strip 190. This strip has elongated lugs 202 and 204 at its free end portion which are bent over to form U-shaped guides through which the contact arms 192 and 194 pass. The bent-over portion of the lug 202 is so spaced from the rigid strip 200 that it will not operate to cause separation of contacts 196 and 186 until after contacts 187 and 198 engage when the rigid strip is urged to the right of the position shown in Figure 3, namely the position illustrated in Figure 4. The bent-over lug 204 insures that contacts 187 and 198 will separate when the rigid member 200 is moved from the position shown in Figure 4 to the position shown in Figure 2. The flexible strip 190 and its associated arms and contacts are normally biased to the position shown in Figure 2.

As shown in Figure 11, the sloping wall 24 of the transverse member 16 has a short bimetallic element 206 having a rigid extension 208 which moves in response to the temperature to which the bimetallic element is subjected, namely the temperature of the wall 24 which will closely follow the temperature of the liquid in compartment 125. The outer end of the rigid extension 208 has secured on one face thereof a layer of insulating material such as mica 211 and this layer of insulating material lies adjacent to a bump on the rigid member 200. As the temperature of bimetallic element 206 rises, the rigid extension 208 moves to the right of the position shown in Figures 1, 2 and 3 and consequently urges the rigid arm 200 and its associated contact assembly to the right into the position shown in Figure 4. When bimetallic element 206 cools the process is of course reversed and the contacts returned to the position shown in Figure 2. Accordingly the contacts 186—196 and 187—198 are open and closed in response to the temperature of the liquid in compartment 125.

Any suitable means may be provided for adjusting the temperature at which these contacts will be operated. The adjustment screws 210 and 212 enable individual adjustment of the contacts 186—187 whereby the opening and closing relationship of these contacts may be controlled. By means of these contacts the degree of overlap can be varied or, if desired, overlap can be entirely dispensed with.

The apparatus may be readily adjusted to cause manipulation of this contact assembly at various temperatures of the liquid in compartment 125. There was described above a means by which the position of the slidable plate 164 would be varied upon rotation of the handle 174. A variation in the position of the slidable plate 164 will cause a corresponding variation in the position of the binding posts 182—184 and the contacts 186—187 carried thereby. Accordingly, rotation of the handle 174 will cause the contacts 186—196 to break and the contacts 187—198 to make at different temperatures of the water in compartment 125.

The manner in which the device operates automatically will now be described more particularly in connection with the schematic wiring diagram of Figure 15. After the user has placed the water and coffee in the vessel and has secured the circulating unit in position by rotation of tube 84 until the bottom of base 92 engages the upstanding lug 42, and after the usual terminals 214—215 have been connected to a source of current by means of a conventional receptacle, the operator simply presses the pin 142 inwardly until the main switch contacts 138 and 140 are in engagement and the latch 148 drops to retain the pin in retracted position and maintain these contacts in engagement. When the contacts 138 and 140 close, the following energizing circuit is set up for the heating element 78: terminal 214, wire 216, contact arm 134, contact 138, contact 140, contact arm 136, conducting strip 218, contact arm 192, contact 196, contact 186, wire 220, heating element 78, wire 222 and terminal 215. Energization of the heating element 78 will cause a rise in the temperature of the water in compartment 125 with the result that bimetallic element 206 will become correspondingly heated and will move its extension to the right of the position shown in Figures 1, 2 and 15. When the temperature of the water and consequently the temperature of bimetallic element 206 reaches a predetermined point, depending upon the setting of the slidable plate 164 by means of the adjustment handle 174, the extension 208 will have moved sufficiently to cause contacts 187—198 to come into engagement, thereby to set up an energizing circuit for the heating element 50. At this stage the position of the parts is as shown in Figure 3. The circuit by which the heating element 50 is energized is as follows: terminal 214, wire 216, contact arm 134, contact 138, contact 140, contact arm 136, conducting strip 218, contact arm 194, contact 198, contact 187, wire 224, heating element 50, wire 226, and terminal 215.

As a result of further rise of the temperature of water in compartment 125, the member 208 moves further to the right and causes disengagement of contacts 186—196 thereby breaking the energizing circuit for the heating element 78. The residual heat in this heating element causes a further rise in the temperature of the water in compartment 125, and in a very short time, steam is generated in the compartment 28 and discharged through the nozzle 89 into the liquid in the compartment 125 at the lower portion of the circulating tube 84. This discharge of steam will cause a flow of water upwardly through the tube 84 which water will be distributed over the coffee in coffee holder 121 and drip back into the main body of the liquid. Such circulation of the liquid through the tube 84 will continue as long as there is any steam issuing from the nozzle 88. When the water in compartment 28 is substantially all converted into steam and exhausted, there will be rapid rise in the temperature of the bottom and the side walls of compartment 28 with the result that bimetallic element 152 will be warped thereby moving its extension 156 and associated abutment screw 158 against the under side of latch 148, thereby to release the pin 142 as shown in Figure 9. When the latch releases the pin the natural spring tension of the contact arm 134 is such as to push the pin outwardly to a point where the latch will rest on the sloping surface of the head 144, thereby providing a visible signal indicating the completion of the infusing operation. Also the spring contact arm 134 will cause separation of contacts 138 and 140. When the main switch contacts 138—140 are thus separated, the extraction is complete and the apparatus has been automatically deenergized.

As previously pointed out, there will be an increase in the temperature of the liquid in compartment 125 after the injection of steam is commenced therein, even though the heating element 78 is deenergized. Accordingly, the maximum temperature at which liquid is passed through the coffee is controlled by controlling the temperature at which the heating element 78 is deenergized and the injection of steam begun. For a constant amount of water in compartment 125, the same maximum infusion temperature will be reached for any given setting of the adjusting handle 174. However, a variation of the amount of water in the compartment 125 will cause a variation in the maximum infusion temperature even though the setting of handle 174 and its associated mechanism for adjusting the position of contacts 186 and 198 is maintained constant. Therefore, to compensate for different amounts of water in the compartment 125, there must be an adjustment of the handle or pointer 174, if uniform or maximum infusion temperature is to be preserved. Thus, if the vessel is sufficiently large to hold eight cups, for example, and it is desired to make only four cups of coffee in the vessel, the device must be adjusted to cause the heating element 78 to become deenergized at a lower temperature than that at which it should be deenergized if eight cups of beverage were being made, in order to prevent the infusing liquid from reaching a higher temperature than it would reach if eight cups were being made. To enable this adjustment in simple fashion, the outside of the skirt 14 is provided with a dial opposite the adjustment handle or pointer 174 showing the setting which should be made for any given number of cups.

By adjusting the handle or dial 174 within the range marked on the dial for any given number of cups, it is possible to control the maximum infusion temperature when such number of cups are being treated and the regulating handle 174 and its associated mechanism accordingly also provide means for controlling the taste of the beverage to the individual preference of the user.

While the steam discharge passageway from compartment 28 is through the removable partition or cover 94—96 it may obviously be through some other portion of the contours of compartment 28. Where it is desired to have a battery of infusing compartments, as for example in the case of a device to be used for commercial purposes, a single steam generating compartment may, if desired, be provided for the several compartments.

It will be observed that it would be impossible for compartment 28 to explode. If for any reason the pressure on the underside of partition 94—96 exceeds the compression of the spring 104, the partition would simply lift and release the pressure. Any other suitable safety means may be provided. The partition 94—96 may be made of flexible spring metal material, for example, and the sliding compression spring arrangement dispensed with. In order to preclude clogging of the nozzle 89 with consequent building up of abnormally high pressures in compartment 28, the passageways 116 and 118 are preferably made of smaller diameter than that of the nozzle 89.

Figures 18, 19:
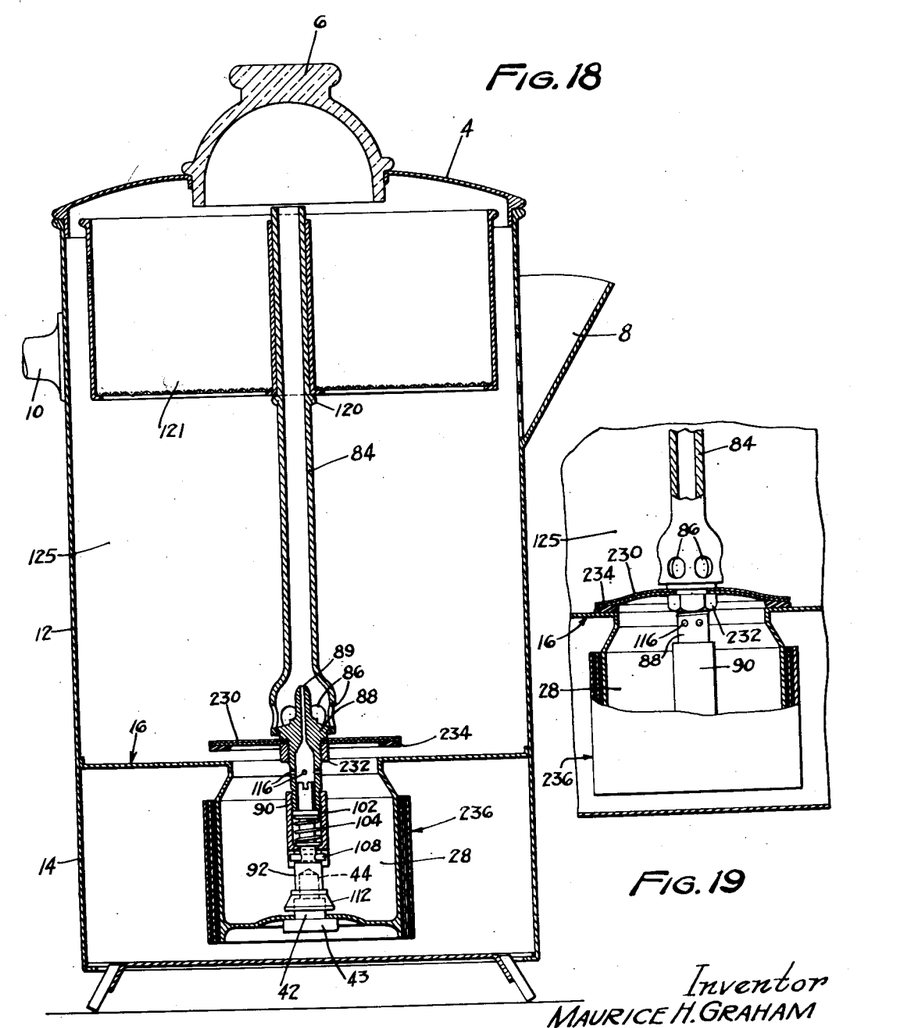
Figure 18 is a vertical sectional view of still another modification of the invention.
Figure 19 is a fragment of the cross-sectional view shown in Figure 18 and illustrating the parts in a different position.

It is not essential to the invention that there be two separate heating elements as in the modification of the invention disclosed in Figures 1 to 15. Figures 18 and 19 illustrate a simplified form of the invention in which a single heating element is used. The vessel of the device disclosed in Figures 18 and 19 is separable into compartments 125 and 28 which are analogous to the compartments marked with like reference numerals in the modification shown in Figure 1. Instead of utilizing an irregular shaped transverse member 16 with an associated separate heating element, as in the modification of Figure 1, the modification of the invention disclosed in Figure 18 employs a plain annular plate which does not have any separate heating element associated therewith, as the transverse member 16. The circulating unit of the apparatus shown in Figure 18 is the same as the circulating unit of the modification shown in Figure 1 with the exception that the cap or partition member 94—96 of Figure 1 is substituted with a bimetallic cover or partition member 230 which is fastened to the nozzle member 88 by means of a tightly screwed ring nut 232 that forces the inner periphery of the bimetallic partition member 230 tightly against a shoulder formed by an enlarged portion of the nozzle member as shown, to form a fluid-tight connection. The lower portion of the steam injector assembly of the modification shown in Figure 18 is exactly like the lower portion of such assembly shown in Figure 5.

When the base 92 of the circulating unit is screwed down tight in the device of Figure 18, and the bimetallic element 230 is cold or at room temperature, the bimetallic cap or partition assumes the position shown in Figure 18 wherein there is a space between the bottom of member 230 and top of well 28 permitting flow of water between the compartments 28 and 125. When the bimetallic cover or partition 230 becomes heated, this member warps into the position shown in Figure 19 in which it closes the top of well 28 thereby forming a compartment entirely closed except for the restricted steam passage through the nozzle member 88. In order to insure a tight fit between the bimetallic partition 230 and the transverse wall 16 after the bimetallic member becomes heated, there may be provided a suitable resilient washer 234 of rubber or the like secured to the outer edges of the bimetallic partition member.

In the operation of the device, the desired amounts of coffee and water are placed into the vessel and due to the position of the bimetallic partition 230 when cold, water will flow under the same and fill up the compartment 28, it being understood that the level of the water in compartment 125 will be above the level of the discharge tip of the nozzle member 88. After the water and coffee are introduced the heating element 236, which may be of a type similar to the heating elements 50 and 78, is energized. The energiaztion of the heating element causes a heating up of the water in compartment 28 and also a heating up of the water in compartment 125 due to convection currents passing under the bimetallic cap or partition 230. When the water in compartments 125 and 28 reaches a predetermined temperature, however, the bimetallic partition 230 will have warped into the position shown in Figure 19 thereby preventing the aforesaid convection currents and trapping the water in compartment 28. The heat of the heating element 236 will at this stage not be distributed throughout the entire body of water, but will pass practically entirely to the water in compartment 28 with the result that this water will be rapidly converted into steam and discharged through the nozzle 88 thereby to set up a flow of infusing liquid through the tube 84 and down through the coffee in the holder 121. A thermostat (not shown) responsive to the temperature of the compartment 28 is provided for automatically deenergizing the heating element 236 when the water in compartment 28 has been converted into steam and discharged into the compartment 125.

Figures 20, 21:
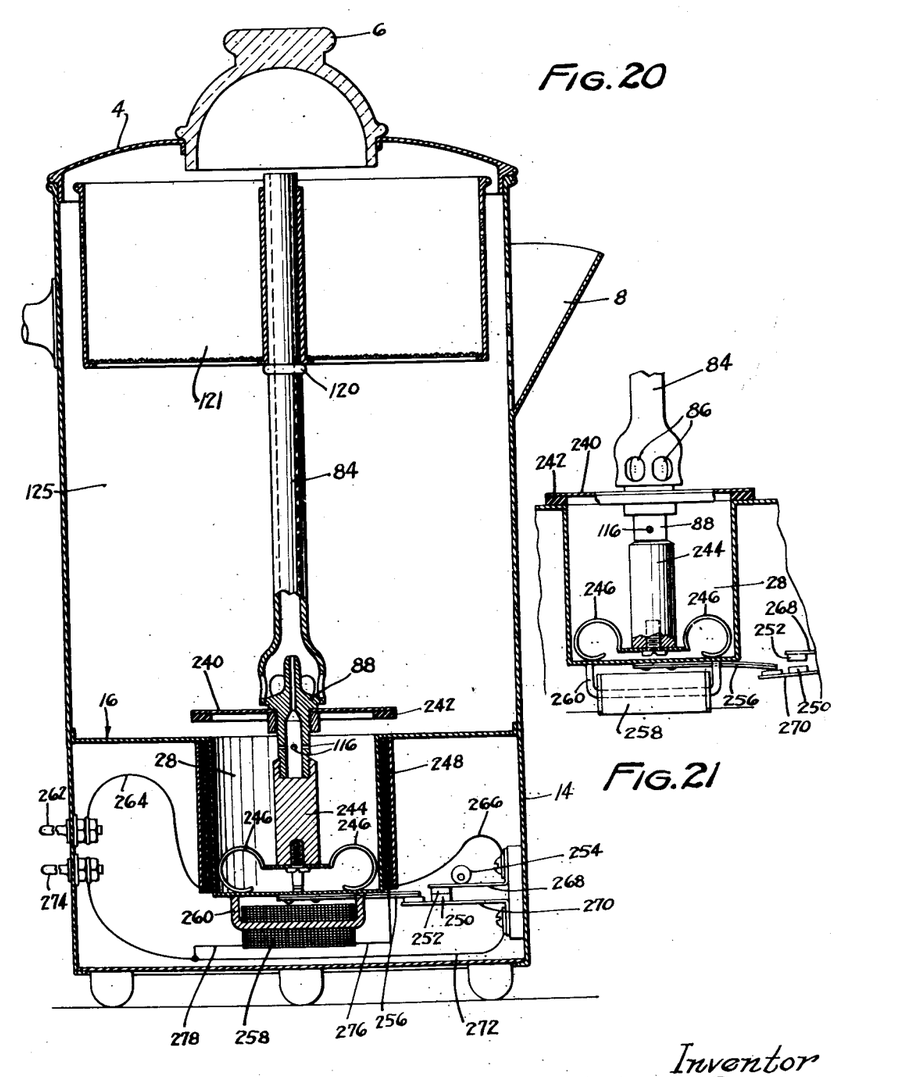
Figure 20 is a vertical cross-sectional view showing yet another modification of the invention.
Figure 21 is a fragmentary cross-sectional view of the modification illustrated in Figure 20 and showing the parts in a different position.

Referring now to Figures 20 and 21 there is therein shown an arrangement quite analogous to that shown in Figures 18 and 19 except that electromagnetic means are used for closing off the compartment 28 thereby to trap the water therein when the temperature of the water reaches a predetermined degree. Referring more particularly to Figure 20, the device shown consists of a vessel separable into an upper compartment 125 and a lower compartment or well 28. The liquid circulating tube 84 and coffee holder 121 are similar to those shown in the modifications previously described and the nozzle member 88 of the steam injector assembly is similar to that shown in the modification of Figure 18.

Numeral 240 designates a cap or partition member of plain, substantially rigid, sheet metal for closing the central opening in the transverse wall 16 thereby to form the compartment 28. This member is preferably provided with a resilient washer of rubber or other suitable material 242 for the purpose of insuring a tight fit. The lower portion of the nozzle member 88 is screw-threaded and engaged with an interiorly threaded recess of a block 244 of iron or other metal capable of being attracted magnetically. This block rests upon spring feet 246 which normally support the steam injector assembly so high that a space is provided underneath the partition member 240 through which water may flow into the compartment 28 and through which convection currents may pass. A flexible heating element 248 which may be of the same type as heating elements 50 and 78 is wrapped and tensioned around the outer walls of compartment 28. Numerals 250 and 252 designate contacts carried by spring contact arms normally biasing them to closed position and numeral 254 designates generally an adjusting cam for adjusting the point at which the contacts are separated when contact 250 is moved in a direction away from contact 252. A bimetallic element 256 is secured to the bottom of compartment 28 whereby this element responds to the temperature of the compartment 28. The bimetallic element presses against an extension of the arm carrying contact 250 and when a predetermined temperature is reached in compartment 28 the bimetallic element 256 will move sufficiently to separate the contact 250 from contact 252. Numeral 258 designates a suitable helix wound about the armature 260.

The water may be inserted either before or after the insertion of the circulating unit composed of the nozzle member 88 and its associated parts which are intended to be permanently or semi-permanently connected together. In either case all that is necessary for the user to do is to grasp the unit by the tube 84 and set it into the pot so that the spring feet 246 rest on the bottom of compartment 28 in the manner shown in Figure 20. In this connection it is noted that the spring feet 246 are of such size and shape that the circulating unit will be automatically centrally positioned when its lower portion is inserted into the compartment 28. After the insertion of the water and coffee, the terminals are connected to a suitable source of electrical current and the heating element 248 is energized through the following energizing circuit: terminal 262, wire 264, heating element 248, wire 266, contact arm 268, contact 252, contact 250, contact arm 270, wire 272, and terminal 274. The energization of heating element 248 will cause the water in both the well 28 and in the upper portion of the container to be heated by convection currents passing beneath the partition member or cap 240. When the temperature of the water within the well 28 reaches a predetermined point depending upon the setting of adjustment cam 254 the bimetallic element 256 will operate to separate the contacts 250—252 thereby breaking the aforementioned energizing circuit for the heating element 248. However, the heating element will continue to remain energized through the following circuit: terminal 262, wire 264, heating element 248, wire 276, helix 258 of the electromagnet, wire 278, wire 272 and terminal 274. It will be noted that in this circuit the heating element and the coil of the electromagnet are in series whereby a heavy current will flow through the electromagnet coil.

The flow of this current will result in an attraction of the block 244 toward the bottom of well 28 with the result that the entire circulating unit will be pulled downwardly and the partition member 240 will close off the top of the well 28 as shown in Figure 21. When this occurs, convection currents can no longer serve to conduct heat from the heating element 248 to the liquid in the compartment 125 and substantially all the heat from the heating element is imparted to the relatively small amount of liquid trapped in compartment 28. The result is that this water is rapidly converted into steam and discharged through the nozzle 88 whereby circulation of infusing liquid through the coffee in holder 121 is set up.

Any suitable means, not shown, may be provided for deenergizing the heating element and the electromagnet when the temperature of compartment 28 rises as a result of the conversion of the water therein into steam and discharge thereof through the nozzle. Such means may consist, for example, of a thermostat similar to thermostat 256 operating to open a switch inserted in a wire 264. Or, the thermostat 256 may itself be arranged to open a switch in wire 264 at a temperature higher than that at which it effects separation of the contacts 250 and 252.

The shaft for the adjusting cam 254 preferably extends through the outer wall of the skirt 14 and is provided with a pointer cooperating with a dial similar to that provided on the device disclosed in Figure 1 and by means of which an adjustment may be made to compensate for variations in the amount of liquid used and to adjust the maximum infusion temperature for any given amount of liquid thereby to control the tastes of the final infusion.

If abnormal pressures should for any reason be set up in compartment 28, it will not explode for the pressure will be automatically released when its force against the partition 240 overcomes the effect of the electromagnet.

Figure 16:
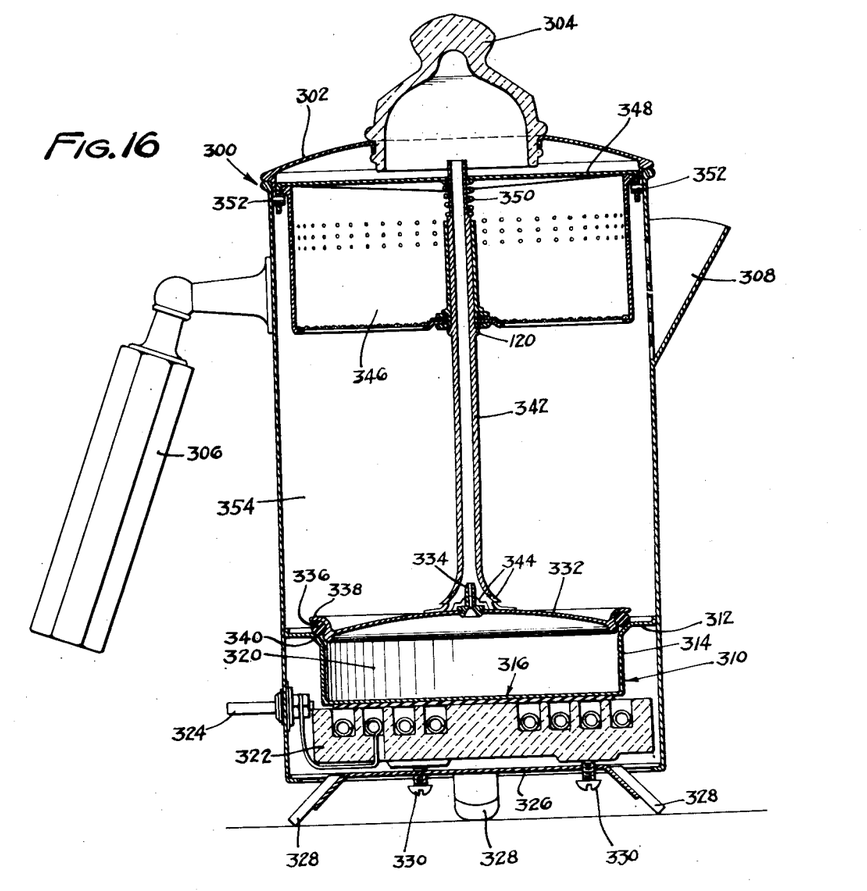
Figure 16 is a vertical cross-sectional view of a modified form of apparatus made in accordance with the invention.

Figure 16 discloses yet another modification in which but a single heater is provided but in which it is unnecessary to provide any automatic temperature responsive means for entrapping a portion of the infusing liquid while the device is in operation. Referring more particularly to Figure 16, the device therein shown consists of a cylindrical member 300 having any desired form of top and liquid distributing elements 302—304 together with handle 306 and usual pouring spout 308. Inside of this member there is an imperforate transverse member generally designated at 310 which member consists of an annular ring portion 312, a vertical cylindrical portion 314 and a depressed central circular portion 316. The depressed portion of the transverse member defined by the wall portions 314 and 316 is in the nature of a well 320. Beneath this well and in contact therewith there is any suitable form of heating element 322 for heating material in the well 320 by conduction and radiation. This heating element is provided with the usual type of terminals 324 for connection to a suitable source of electric power. The shell is provided with a bottom 326 and supported by suitable legs 328. Screws 330 are provided for holding the heating element 322 in contact with the bottom of the well 320 and for holding the cover 326 in position.

Numeral 332 designates a partition member which is adapted to cover the top of the well 320 and convert the well into a compartment which is closed except for a restricted steam discharge nozzle 334 which is positioned centrally of the removable partition 332. A washer 336 of circular cross-section is preferably provided for engagement between a flange 338 on the removable partition 332 and the beveled edge portion 340 at the upper edge of the well 320, the purpose of the washer 336 being to insure a fluid-tight connection.

Figure 17:
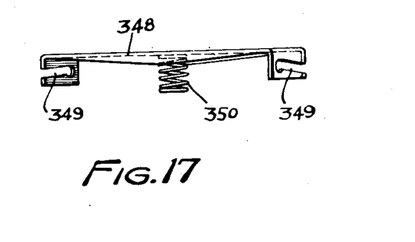
Figure 17 is a view showing a fastening device for the apparatus shown in Figure 16.

Secured to the top of the removable partition member 332 by any desired means such as welding or soldering and extending upwardly therefrom is a liquid circulating tube 342 having an enlarged lower portion provided with water inlet openings 344 into which the steam nozzle 334 extends as shown. The upper portion of the liquid circulating tube 342 is provided with a rib on which any suitable coffee holder 346 is supported. Any suitable means may be provided for fastening the removable partition member 332 in the position shown in Figure 16. As there shown, such fastening means consists of a rigid member 348 (shown in detail in Figure 17) having depending lugs provided with grooves at either end. The fastening device has an opening to accommodate the upper portion of tube 342 at its center and has a compression spring 350 secured thereto at this opening. Pins 352 having a diameter slightly less than the widths of the slots in the lugs of the member 348 are secured to the inside of the walls of the cylindrical member 300. After the removable partition member 332 and its connected tube 342 have been placed in the position shown in Figure 16, and the coffee holder has been mounted on the tube, the clamping member 348 is inserted over the top of the tube with the result that the spring 350 will surround the upper portion of the tube and will be stopped by a shoulder formed thereon. The member 348 is then manually rotated until the pins 352 come into engagement with the slots 349 and upon continued manual rotation of the member 348 it will be urged downwardly due to the slant of the slots whereby the compression spring 350 will bear against the aforementioned shoulder on the tube 342 and will press the removable partition member 332 against the top of the well 320.

It will be observed that when the removable partition member is in place, there is defined an upper compartment 354 and the well 320 constitutes a lower compartment.

In the use of the device, the desired amount of water is inserted therein, the removable partition member 332 and the other parts are arranged in the position shown in Figure 16 with the coffee in the holder 346. The heating element 322 is then energized with the result that the water contained in the compartment 320 will convey heat by conduction to the removable partition 332, which is of rather extensive area, and thereby heat the water in the compartment 354. After the heating has continued for a time, the temperature of the water in the compartment 320 will rise considerably more rapidly than the temperature of the water in compartment 354 with the result that the water in compartment 320 will pass the boiling point and be converted into steam which discharges through the nozzle 334. Such discharge of steam causes the elevation of water in the tube 342 and a circulation of the liquid in compartment 354 through the coffee in holder 346. As a specific example of the operation of this modification of the invention, a device of the type shown in Figure 16 designed for the making of six cups of coffee may have this amount of water placed therein and the heating element 322 energized. When the temperature of the water in compartment 354 reaches about 160° F., the water in the compartment 320 begins to be converted into steam, with the result that a circulation is set up through the tube 342 and through the coffee as above stated. The water will continue to circulate until no more steam issues from the compartment 320 and the parts may be so designed that when the steam in compartment 320 is exhausted the temperature of the liquid in compartment 354 will be at any desired temperature as for example 195°, and the coffee will be extracted to the desired degree.

Any suitable means may be provided for automatically deenergizing the heating element when the water in compartment 320 is exhausted as for instance a thermostat connected to a wall of the compartment 320 and operating to break the energizing circuit when heated to a sufficiently high temperature.

In place of providing the electrical heating element, the device may be arranged for heating on a simple gas or other flame and in no case will overheat the infusion.

It will be understood that the foregoing examples of the invention are merely illustrative and that numerous variations and additional modifications may be made within the scope thereof.

Having now described my invention, what I claim as new and desire to secure by Letters Patent of the United States, is as follows:

1. An apparatus for making coffee infusions comprising a coffee holder, a compartment for the infusing liquid, a steam generating compartment for containing a body of water separate from that in the first said compartment and provided with a steam discharge opening and a water inlet opening, a removable cover for the water inlet opening, and means for circulating and recirculating infusing liquid from the first said compartment through said coffee by steam generated in said generating compartment, and issuing through said discharge opening, said steam compartment being closed except for said steam discharge opening when said cover is in place.

2. An apparatus for making infusions of coffee, comprising a coffee holder, a compartment for water, a second compartment having a steam discharge opening and a water inlet opening for admitting water independently of said steam discharge opening, a removable cover for said water inlet opening, means for heating water in the second compartment to generate steam therein, a steam nozzle connected to said steam discharge opening and discharging into the first said compartment at a point below the normal level of the liquid contained therein, and means associated with said nozzle for circulating liquid contained in the first said compartment through the coffee when steam is discharged from said nozzle, said steam compartment being closed except for said steam discharge opening when said cover is in place.

3. An apparatus for making infusions of coffee comprising, a coffee holder, a vessel for containing water, a movable partition wall for separating said vessel into a first compartment for the main body of infusing liquid and a second compartment for a separate quantity of water, said second compartment having a restricted steam discharge opening and being closed except for such opening when said partition wall is in place to form the said two compartments, means for heating the water in said second compartment to generate steam therein, and means for circulating liquid from said first compartment through said coffee by steam generated in said second compartment and issuing through said discharge opening, said second compartment being large enough to provide sufficient steam for continuing said circulation substantially uninterruptedly until the extraction of the coffee is completed to substantially the desired degree, and substantially without boiling any infused liquid.

4. An apparatus for making infusions of coffee comprising a vessel formed with a well at its lower portion and adapted to contain liquid to a point above the level of the top of said well, a cover for the well having a steam discharge opening and which cover when in place constitutes a partition dividing the vessel into two compartments the first of which lies above the cover and contains the main body of the infusing liquid and the second of which lies below the cover and contains the water trapped in the well by the cover, means for heating the liquid in said well and converting the same into steam, a steam nozzle connected to said steam discharge opening in the cover and discharging into the first compartment at a point below the normal level of the liquid therein, a coffee holder above the normal level of the liquid contained in said first compartment, and a tube associated with said nozzle for elevating liquid from said first compartment in substantially a stream and causing the same to circulate through the coffee in the holder when steam from said second compartment is discharged through said nozzle, said compartment being closed except for said steam discharge opening.

5. An apparatus for making coffee infusions comprising a liquid containing vessel, a coffee holder above the normal level of the liquid contained in the vessel, thermally responsive means for separating said vessel into two compartments each containing a portion of the liquid initially contained in the vessel when the liquid reaches a predetermined temperature, means for heating the liquid in one of said compartments to generate steam therein, and means for injecting such steam into the liquid of the other compartment and circulating the same through said coffee.

6. An apparatus for making coffee infusions comprising a first compartment for the main body of infusing liquid, a second compartment for a separate body of water, means for heating the water in said first compartment, means for heating the water in said second compartment and generating steam therein under pressure means for injecting said steam into said main body and causing same to circulate through the coffee being infused, and means for rendering the first said heating means inoperative when the temperature of the water in the first compartment reaches a predetermined point.

7. An apparatus for making coffee infusions comprising a first compartment for the main body of infusing liquid, a second compartment for a separate body of water, means for heating the water in said first compartment, means for heating the water in said second compartment to generate steam under pressure, means for injecting said steam into said main body and causing same to circulate through the coffee being infused, means for rendering the first said heating means inoperative when the temperature of the water in the first compartment reaches a predetermined point, and means for rendering the second said heating means inoperative when the temperature of the second compartment reaches a predetermined temperature higher than that of the water in the first compartment when the first said heating means was rendered inoperative.

8. An apparatus for making coffee infusions comprising a first compartment for the main body of infusing liquid, a second compartment for a separate body of water, means for heating the water in said first compartment, means for heating the water in said second compartment to generate steam under pressure, means for injecting said steam into said main body and causing same to circulate through the coffee being infused, thermally responsive means for instituting operation of the second said heating means when the temperature of the water in the first said compartment is at a predetermined point, and thermally responsive means for rendering the first said heating means inoperative when the temperature of the water in the first compartment reaches a slightly higher point.

9. An apparatus as claimed in claim 8 wherein said thermostatically responsive means are adjustable as to the temperatures at which they will operate, whereby the maximum temperature of the infusing liquid may be controlled.

10. A coffee making device comprising, a vessel for a body of infusing liquid, a coffee holder normally spaced from said body and discharging newly infused liquid back thereto, steam nozzle means for continuously circulating infusing liquid from said body to the coffee in said holder while previously infused liquid is being discharged back to said body for admixture therewith, means for continuously generating steam from water substantially free of solubles of the coffee and continuously supplying such steam to said steam nozzle means all the while until the extraction of the coffee in the holder has been completed to substantially the desired degree, and thermally responsive means for controlling said coffee making device upon completion of said extraction to the desired degree.

11. A coffee making device comprising, a vessel for a body of infusing liquid, a coffee holder normally spaced from said body and discharging newly infused liquid back thereto, steam nozzle means for continuously circulating infusing liquid from said body to the coffee in said holder while previously infused liquid is being discharged back to said body for admixture therewith, means to said body for admixture therewith, means including a heater for continuously generating steam from water substantially free of solubles of the coffee and continuously supplying such steam to said steam nozzle means all the while until the extraction of the coffee in the holder has been completed to substantially the desired degree, and means for rendering said heater inoperative when substantially all the water contained in said generating means at the start of the infusing operation has been exhausted.

12. An apparatus for making infusions of coffee as claimed in claim 2 wherein means are provided for interrupting the action of the heating means when substantially all the water originally contained in said second compartment at the start of the infusing operation has been discharged into the first said compartment.

13. A beverage infusion apparatus including a vessel housing, a liquid storage chamber adapted to maintain infusing liquid therein below the boiling point, a perforate container housing an infusing chamber spaced from the stored liquid contained in the storage chamber, a fountain tube having an inlet end communicating with the storage chamber and adapted to conduct liquid to be infused from the storage chamber to the infusing chamber, a separate fluid-tight auxiliary container housing a steam-generating heating chamber adapted to be initially prefilled with a predetermined limited quantity of water, a heater for said heating chamber, a small steam nozzle operative during heating of the steam-generating chamber to discharge a jet of steam from said chamber outwardly into the fountain tube to propel liquid from the storage chamber through the fountain tube to the infusing chamber, and means for rendering said heater inoperative when substantially all the water initially contained in said heating chamber has been exhausted, said nozzle being relatively minute whereby to prevent passage inwardly therethrough to the steam-generating chamber of liquid from the storage chamber during application of heat to the steam-generating chamber, the steam-generating chamber being closed during the entire infusing operation to the admission of liquid thereto so that the infusing operation, unless sooner terminated by discontinuance of heating of the steam-generating chamber, will be automatically stopped upon exhaustion of the original limited quantity of water initially contained in the steam-generating chamber.

14. An apparatus as claimed in claim 6, wherein means are provided for adjusting the temperature at which said first said heating means is rendered inoperative.

15. An apparatus for making coffee infusions comprising a first compartment for the main body of infusing liquid, a second compartment for a separate body of water, means for heating the water in said first compartment, means for heating the water in said second compartment and generating steam therein under pressure, and means for injecting said steam into said main body and causing same to circulate through the coffee being infused, and means for rendering the heating means for the second said compartment operative when the temperature of the water in the first said compartment reaches a predetermined point.

16. A coffee making device comprising, a vessel for a body of infusing liquid, a coffee holder normally spaced from said body and discharging newly infused liquid back thereto, a steam pump for continuously circulating and recirculating infusing liquid from said body through said coffee to completely extract the coffee to substantially the desired degree while simultaneously heating and raising the temperature of said body but substantially without boiling any of the infused liquid, means including a heater for continually generating steam from plain water substantially free of solubles of the coffee and continuously supplying such steam to said pump all the while until the extraction of the coffee in the holder has been completed to substantially the desired degree, and thermally responsive means for rendering the heater inoperative when said extraction has been completed to substantially the desired degree.

17. A coffee making device comprising, a vessel for containing a body of infusing liquid at a temperature substantially below boiling, a coffee holder spaced from said body and discharging newly infused liquid back thereto, a steam pump for continuously circulating and recirculating infusing liquid from said body through the coffee to completely extract the coffee to substantially the desired degree and simultaneously heating and raising the temperature of the said body of infusing liquid to a point below the temperature of boiling substantially without boiling any of the infusion, means for continuously generating steam from plain water free of solubles of coffee and supplying the same to said steam pump all the while until the extraction of the coffee is completed to the desired degree, and thermally responsive means for controlling the steam generating and supplying means when the extraction of the coffee is completed to the desired degree, the thermal relationship of said infusing liquid vessel and said steam generating and supplying means being such that the infusing liquid will not be heated to boiling upon generation of steam by the latter for extraction of the coffee to the desired degree.

18. A coffee making device comprising, a vessel for containing a body of infusing liquid at a temperature substantially below boiling, a coffee holder spaced from said body and discharging newly infused liquid back thereto, and means for preheating said body and then circulating and recirculating infusing liquid therefrom through the coffee to completely extract the coffee to substantially the desired degree while simultaneously further heating and raising the temperature of the said body of infusing liquid to a point below the temperature of boiling substantially without boiling any of the infusion; said means including a steam injector type circulating pump having a circulating tube associated therewith and a steam nozzle discharging into said liquid body at a point below its normal upper level, and means for continuously generating steam from plain water free of solubles of coffee all the while until the extraction of the coffee is completed to the desired degree, and continuously supplying such steam to the said circulating pump; and thermally responsive means for controlling the steam generating and supplying means when the extraction of the coffee is completed to the desired degree, the thermal relationship of said infusing liquid containing vessel and said steam generating and supplying means being such that the infusing liquid will not be heated to boiling upon generation of steam in the latter for extraction of the coffee to the desired degree.

19. A coffee making device comprising, a vessel for containing a body of infusing liquid at a point substantially below boiling, a coffee holder normally spaced from said body and discharging newly infused liquid back thereto, and means for circulating and recirculating infusing liquid from said body through said coffee to completely extract the coffee to substantially the desired degree substantially without boiling any of the infused liquid, said means including a steam injector pump having circulating conduit associated therewith and having a steam nozzle provided with a restricted passageway discharging into said conduit at a point below the upper level of the liquid contained in said vessel in substantially the direction of flow of liquid circulating through said conduit, and means including a generator for continuously generating steam for said nozzle from plain water substantially free of solubles of coffee and supplying the same to said nozzle all the while until the said extraction has been completed to substantially the desired degree, and thermally responsive means for controlling the said steam generating and supplying means when the extraction of the coffee is completed to substantially the desired degree.

20. A domestic type coffee infusing device comprising a portable vessel forming a chamber for a body of infusing liquid, a coffee holder normally spaced from said liquid body and discharging newly infused liquid back to said chamber, steam nozzle means for continuously circulating infusing liquid from the body in said chamber to the coffee in said holder while previously infused liquid is being discharged back to said chamber for admixture with said body, and steam generating means for supplying said steam nozzle means with steam generated from plain water substantially free of solubles of the coffee continuously all the while until, and only until, said liquid body has been infused to the desired degree, said steam generating means comprising a plain water receptacle intimately associated and portable with said vessel, said receptacle having a size appreciably smaller than that of the infusing liquid chamber and being closed during the entire infusing operation to the admission of liquid from said chamber, the size of said plain water receptacle being such that the maximum amount of plain water it will hold when prefilled is sufficient to produce only an amount of steam substantially equal to that required to continue the circulation of a maximum amount of infusing liquid in said chamber substantially only until the body of said liquid has been infused to the desired degree, whereby the infusion is substantially completed and discontinuance of the infusing period is effected upon exhaustion of water in the steam generating receptacle.

MAURICE H. GRAHAM.